UNITED STATES PATENT OFFICE.

PAUL THOMASCHEWSKI AND HEINRICH RAEDER, OF VOHWINKEL, AND WALTER MIEG AND PAUL FISCHER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

YELLOWISH-RED VAT DYE.

986,521.      Specification of Letters Patent.      Patented Mar. 14, 1911.

No Drawing.      Application filed April 21, 1910.    Serial No. 556,654.

*To all whom it may concern:*

Be it known that we, PAUL THOMASCHEWSKI and HEINRICH RAEDER, residing at Vohwinkel, and WALTER MIEG and PAUL FISCHER, residing at Elberfeld, Germany, citizens of the German Empire, have invented new and useful Improvements in Yellowish-Red Vat Dye, of which the following is a specification.

Our present invention relates to the manufacture and production of a new vat dye of the anthracene series.

The process for its preparation consists in condensing 1-benzoylamino-6-chloroanthraquinone with 1-aminoanthraquinone.

The new product is, after being dried and pulverized, a brown powder soluble in pyridin and nitrobenzene with a brownish-orange color and soluble in concentrated sulfuric acid with a blue color. It yields upon treatment with hydrosulfite and caustic soda lye an orange vat suitable for dyeing cotton fast yellowish-red shades.

In carrying out the new process practically we can proceed as follows, the parts being by weight. A mixture of 10 parts of 1-benzoylamino-6-chloroanthraquinone, 7 parts of 1-aminoanthraquinone, 1 part of $CuCl_2$, 8 parts of anhydrous sodium acetate and 75 parts of naphthalene is heated to boiling for about 6 hours while the mixture is stirred. The resulting dye is precipitated from the melt with naphtha. After cooling to 40–50° C. the dye is filtered off, washed with naphtha, glacial acetic acid and water and dried.

We claim:—

The herein described new vat dyestuff of the anthracene series which can be obtained by condensing 1-benzoylamino-6-chloroanthraquinone with 1-aminoanthraquinone, which dyestuff is, after being dried and pulverized, a brown powder, which is soluble in pyridin and nitrobenzene with a brownish-orange color; soluble in concentrated sulfuric acid with a blue color; giving an orange vat with hydrosulfite and caustic soda lye, which vat dyes cotton yellowish-red shades, substantially as described.

In testimony whereof we have hereunto set our hands in the presence of two subscribing witnesses.

PAUL THOMASCHEWSKI. [L. S.]
       HEINRICH RAEDER. [L. S.]
       WALTER MIEG. [L. S.]
       PAUL FISCHER. [L. S.]

Witnesses:
   OTTO KÖNIG,
   WALTER VONNEGUT.